United States Patent [19]

Bacher

[11] 4,353,451
[45] Oct. 12, 1982

[54] DIAPHRAGM CLUTCH MECHANISM

[75] Inventor: Michel Bacher, Garges-les-Gonesse, France

[73] Assignee: Valeo, Paris, France

[21] Appl. No.: 160,461

[22] Filed: Jun. 18, 1980

[30] Foreign Application Priority Data

Jun. 25, 1979 [FR] France .............................. 79 16225

[51] Int. Cl.$^3$ ............................................ F16D 13/44
[52] U.S. Cl. ................................................ 192/89 B
[58] Field of Search ............... 192/89 B, 99 A, 109 R, 192/99 R

[56] References Cited

U.S. PATENT DOCUMENTS 4,039,059  8/1977  Gennes .............................. 192/89 B
4,084,674  4/1978  Gennes .............................. 192/89 B

FOREIGN PATENT DOCUMENTS 1427672  1/1966  France .
2376969  8/1978  France .
1165998  10/1969  United Kingdom .
1195952  6/1970  United Kingdom .

Primary Examiner—George H. Krizmanich
Attorney, Agent, or Firm—Young & Thompson

[57] ABSTRACT

A diaphragm clutch mechanism for a motor vehicle has a diaphragm spring which rocks between a primary fulcrum support provided on the cover and a secondary fulcrum support retained by fastening structure which fastens the diaphragm to the cover for rocking movement with respect thereto. The fastening structure comprises lugs extending from the cover, each having an axial portion passing through openings in the diaphragm, and an outwardly turned radial portion, these portions defining between them a wedging bend. An annular support ring forms (directly or indirectly) the secondary fulcrum support and this is wedged in position against the wedging bend by thrust tabs provided on the cover or the support ring which are applied against a wedging zone that is spaced from the primary and secondary supports to pre-stress the support ring by an amount which is greater than the declutching force. The primary and secondary supports are spaced apart a distance greater than the thickness of the diaphragm, whereby a clearance is provided between the fulcrum supports and the diaphragm so that the diaphragm is not gripped by the supports. Clamping friction is thereby avoided.

10 Claims, 8 Drawing Figures

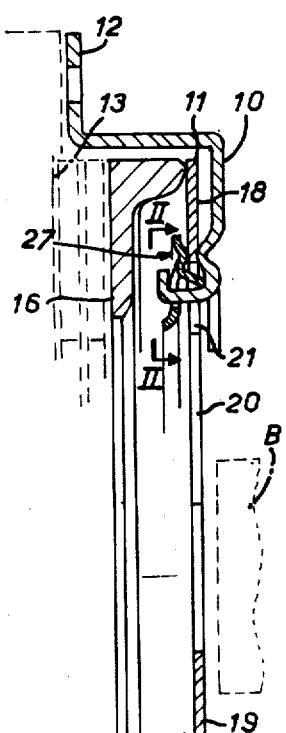
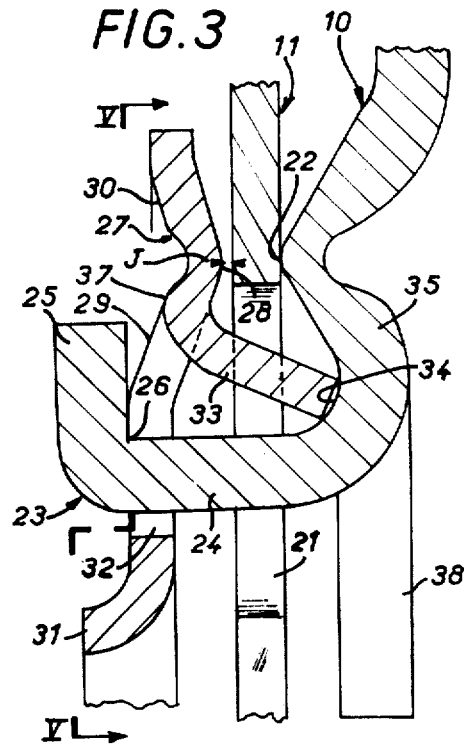
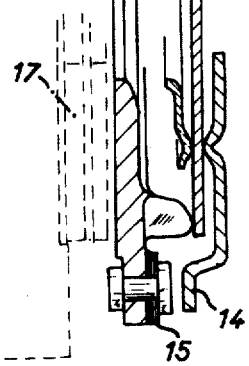
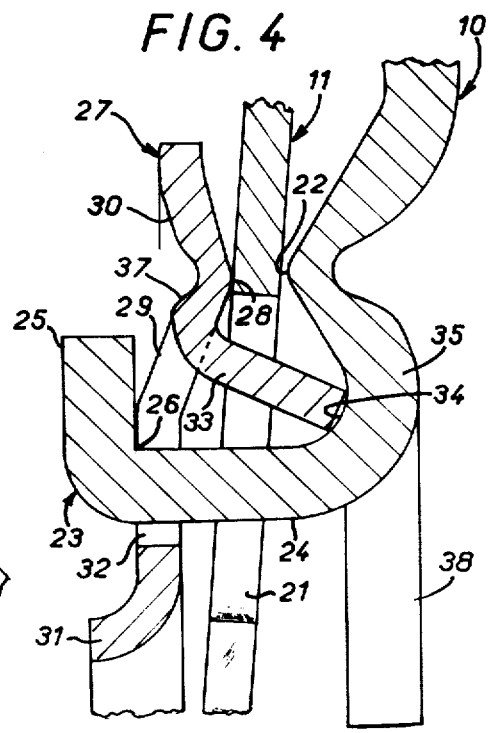

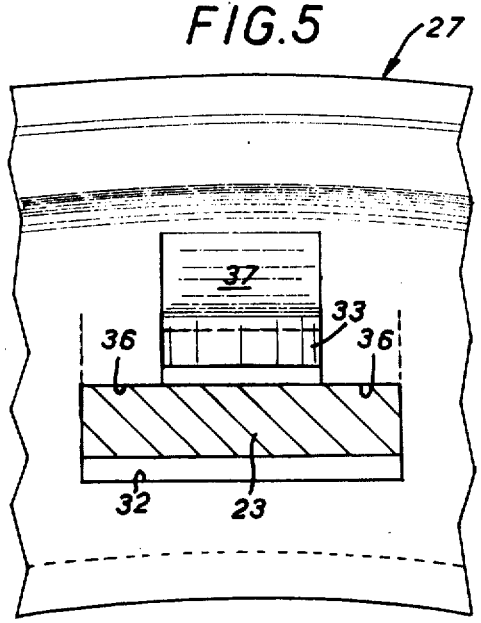
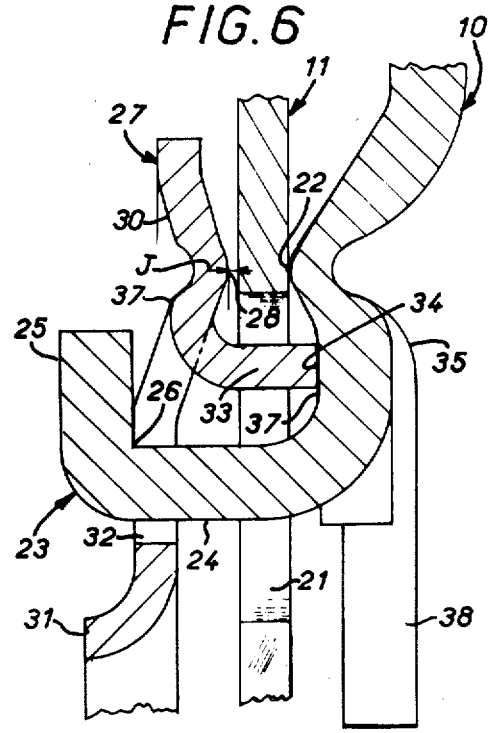
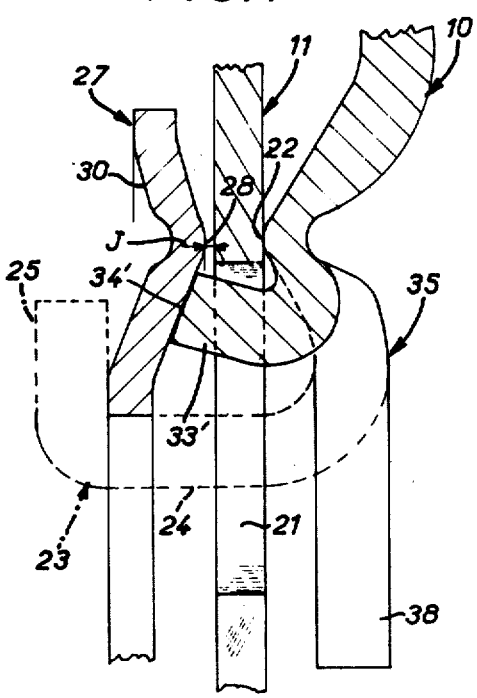
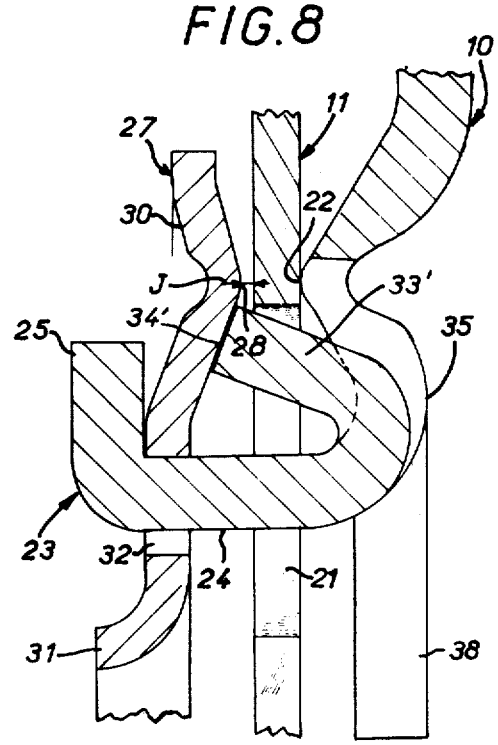

4,353,451

DIAPHRAGM CLUTCH MECHANISM

BACKGROUND OF THE INVENTION

The present invention relates to a diaphragm clutch mechanism, particularly for a motor vehicle, of the kind comprising a first generally annular part known as the cover adapted to be peripherally attached to a first plate known as the reaction plate or flywheel, and also to be rotationally fixed to a second plate known as the pressure plate; a second generally annular part known as the diaphragm and comprising a peripheral portion forming a Belleville spring for acting on the pressure plate and a central portion divided into radial fingers for acting on a clutch release bearing; and connection means fastening the diaphragm to the cover and comprising fastening members extending from the cover having an axial portion and a radial portion, which portions define between them a wedging band, and an annular supporting ring wedged in said bend, the cover and the ring defining directly or indirectly, for the diaphragm, a primary fulcrum support and a secondary fulcurm support respectively, these supports being disposed substantially opposite one another.

As a rule in clutch mechanism of this type the supporting ring is elastic and axially applies the diaphragm against the primary support of the cover with a predetermined elastic clamping load which may be of any suitable value higher or lower than or substantially equal to the clutch release force, this being the force that is applied by means of the clutch release bearing to the diaphragm in order to disengage the clutch.

Clutch mechanism of this type may perform satisfactorily. Nevertheless, they have the disadvantage that, however low the abovementioned elastic clamping load is, considerable friction is introduced at the primary and secondary supports between which the diaphragm is gripped.

A main object of the present invention is to provide a diaphragm clutch mechanism, particularly for a motor vehicle, which possesses all the advantages inherent in mechanisms of the kind described above, but which is free from this disadvantage.

SUMMARY

According to the invention, a diaphragm clutch mechanism of this kind is characterised in that slight play is provided between the primary and secondary supports and the diaphragm, and that the annular support ring is wedged on the cover not only in the aforesaid bend, but also by a wedging zone spaced from the said bend, and in that prestressing force greater than the clutch release force is developed on the support ring between the wedging bend and the said wedging zone.

As the result of this arrangement the secondary fulcrum support has substantial rigidity because the support ring is prestressed, even when this ring has a small thickness.

In one embodiment thrust tabs are cut out from the support ring and bear against the wedging zone which is formed on the cover, while in another arrangement such tabs are cut out from the cover itself and in this case the support ring itself bears against these tabs.

With a view to providing the prestressing to which the support ring is subjected, it is advantageous to proceed as follows.

The various parts are first assembled in relation to one another in the position of rest, so that preliminary play substantially greater than the predetermined final play is provided between the diaphragm and the primary and secondary supports. This preliminary play is obtained by stacking the various parts without particular precautions, the thrust tabs not yet occupying their final position. A thrust is then applied to the support ring in the direction of the diaphragm, so as to incurve the thrust tabs against the aforesaid wedging regions in order to reduce the preliminary play and bring it to the predetermined value. The radial portions of the members solid with the cover are then shaped to define the wedging bend and to provide the final play.

BRIEF DESCRIPTION OF THE DRAWINGS

FIG. 1 is a view in axial section of a diaphragm clutch mechanism according to the invention;

FIG. 2 is a partial view of the support ring of this mechanism, in elevation in the direction of the arrows II—II in FIG. 1;

FIG. 3 is a view on a larger scale of a detail of FIG. 1, the mechanism being in the engaged position;

FIG. 4 is a similar view to FIG. 3, but shows the mechanism in the disengaged position;

FIG. 5 is a view taken on the broken line V—V in FIG. 3; and

FIGS. 6, 7, and 8 are similar views to FIG. 3, but relate to three different embodiments.

DESCRIPTION OF THE PREFERRED EMBODIMENTS

Reference will first be made to FIGS. 1 to 5, in which a diaphragm clutch mechanism for a motor vehicle comprises a first generally annular part 10 known as the cover and a second generally annular part 11 known as the diaphragm.

On its periphery the cover 10 has a first series of coplanar areas 12 by which it can be fixed to a first plate 13 known as the reaction plate or flywheel, and a second series of coplanar areas 14 axially set back in relation to the first series of areas and adapted to be coupled by tangential tongues 15 to a second plate 16, known as the pressure plate.

The tongues 15 rotationally fasten the plate 16 to the cover 10 and allow the plate 16 sufficient axial mobility to ensure that under the action of the diaphragm 11 a friction disc 17 interposed between the plates 13 and 16 can be gripped between the latter.

The diaphragm 11 has a peripheral portion 18 forming an elastic washer of the Belleville spring type for acting on the pressure plate 16.

The diaphragm 11 also has a central portion divided into radial fingers 19 separated by slots 20 originating from passages 21 provided between the fingers 19 in the zone in which the said fingers are joined to the peripheral portion of the diaphragm 11 forming the Belleville spring 18.

A movable control member in the form of a clutch release bearing B, is adapted to act on the free ends of these radial fingers 19 (which are nearest the axis of the whole arrangement).

Assembly means are provided for pivotally fastening the diaphragm 11 to the cover 10. The diaphragm 11 cooperates with a primary circular fulcrum support 22, which in the example illustrated is formed by a dished portion of the cover 10.

In the example illustrated in FIGS. 1 to 5, these assembly means comprise a circular series of spaced fastening members 23 integral with the cover 10 and having an axial portion 24 passing through passages 21 in the diaphragm 11, and a radial portion 25 extending towards the outer periphery of the mechanism, these portions defining between them a wedging bend 26.

More particularly, these members 23 are composed of relatively flat, thin lugs extending directly from the cover 10 and integral therewith, from which they are suitably cut out and appropriately folded.

The assembly means also comprise an inner support ring 27 defining for the diaphragm 11 a secondary fulcrum support 28 disposed substantially opposite the primary fulcrum support 22 formed by the dished portion of the cover 10. The supports 22 and 28 are disposed on a larger radius than the axial portion 24. In the example illustrated in FIGS. 1 to 5, the cover 10 and the support ring 27 directly form the supports 22 and 28 for the diaphragm 11, but they could form these supports indirectly, for example with the aid of one or more intermediate parts.

In FIGS. 1 to 5 there can be seen at 35 a rounded portion of the cover 10 situated between the primary support 22 and the axial portion 24 of the lugs 23. Flat lugs 38 extend towards the axis and alternate with the lugs 23, these lugs 38 being intended to serve as an abutment for the unstressed diaphragm 11 when the mechanism is not mounted on the flywheel 13, that is to say in the storage position.

In the example illustrated in FIGS. 1 to 5 the support ring 27 has a cross-section in the shape of a very open V with a main flange 29, which forms a Belleville spring, extending towards the periphery of the mechanism between the wedging bend 26 and the secondary support 28, and an auxiliary flange 30 which is shorter than the main flange and which forms an extension of the latter in the direction of the periphery of the mechanism. The support ring 27 has in addition a heel part 31 which forms an extension of it in the direction of the axis of the mechanism, beyond the axial portion 24. This heel part 31 has an incurved shape, as can be seen in FIG. 3. In a position corresponding to each lug 23 the support ring 27 has a passage 32 intended to allow the axial portion 24 to pass through.

In addition, a thrust tab 33 is cut out from the support ring 27 and extends towards a wedging region 34 of the cover, which wedging region is situated in the rounded portion 35 lying between the primary support 22 and the axial portion 24. It should be noted that the wedging region 34 could be provided on lugs 38.

The tab 33 has an inverse inclination to that of the main portion 29, so that the whole arrangement of parts 29 and 33 is firmly seated. The tab 33 is cut out from the support ring 27 in a zone 37 situated between the secondary support 28 and the wedging bend 26.

It will be seen in FIG. 5 that the tab 33 is narrower than the lug 23, so as to provide laterally two bearing surfaces 36 by which the support ring 27 is effectively supported on the wedging bend 26.

The zone 37 is situated near the secondary support 28, thus imparting great stiffness to that portion of the fulcrum ring 27 which is situated between the secondary support 28 and the zone 37, and consequently providing for the secondary support 28 the great rigidity required, independently of the stiffness of the support ring 27 itself. This makes it possible to give the ring 27 a minimal thickness, particularly when the ring 27 is provided with the stiffening heel part 31, as illustrated.

The support ring 27 is thus wedged on the cover 10 between bend 26 and the region 34, the prestressing between 26 and 34 being greater than the clutch release force which is applied by the clutch release bearing B for the purpose of disengagement of the clutch.

In this prestressed position, a small predetermined play J is provided between the primary support 22 and secondary support 28 and the diaphragm 11. To give an idea, this play J is of the order of one tenth of a millimeter. It will be appreciated that the prestressing developed between 26 and 34 on the support ring 27 will lock the latter in position.

For assembly purposes the cover 10 is arranged with the lugs 23 only partially folded, with the portions 25 in line with the axial portions 24. The diaphragm 11 and the support ring 27 are threaded onto these lugs, and the arrangement is such that the secondary support 28 is then in the condition of rest, spaced apart from the diaphragm 11 by a preliminary play greater than the play J—for example, to give an idea, ten times as great as the play J, that is to say of the order of 1 millimeter.

In this position a thrust is applied, with the aid of a blank holder, to the support ring in the direction of the diaphragm 11, which has the effect of further inclining the tabs 33 and reducing the preliminary play so as to bring it to the desired value of the play J, which is of the order of one tenth of a millimeter.

The portions 25 are then bent over, so that they assume their final radial position in relation to the axial portions 24, thus making the play J definitive.

The ring 27 is then in a stressed condition with a prestressing greater than the clutch release force, and defines an extremely strong secondary support 28, even where it is of minimal thickness.

In the position of clutch engagement the mechanism occupies the position shown in FIG. 3. When the clutch release bearing B bears against the fingers 19 of the mechanism 11 for the purpose of disengagement of the clutch, the diaphragm 11 is displaced from the position shown in FIG. 3 to that shown in FIG. 4 and, in the course of this displacement, the diaphragm passes from the primary support 22 to the secondary support 28, the play J enabling the diaphragm 11 to incline freely without any friction clamping occurring at the supports 22 and 28. It will be appreciated that the play between the supports may be present on either one or both sides of the diaphragm depending on the operating position at any given moment.

Reference will now be made to FIG. 6, in which, as a modification, the arrangement is similar to that which has just been described with reference to FIGS. 1 to 5, with the exception that each tab 33, instead of extending in an inclined manner as in FIG. 3, extends parallel to the axis, that is to say parallel to the axial portions 24 of the lugs 23. At 34 can be seen once again the wedging region, which is still spaced substantially apart from the bend 26 and which is here defined by a substantially flat portion 37 of the cover 10, thus providing excellent wedging conditions. In FIG. 6 the predetermined play J can be seen again. The assembly and functioning are similar to those previously described.

In another modified embodiment (FIG. 7) the arrangement is still similar to those which have been described above, but the thrust tabs, here designated 33' are cut out from the cover 10 and not from the support ring 27. At 34' can be seen once again the wedging region which is provided on the tabs 33', and which cooperates with the support ring 27 so as to enable the latter to be given stiffening prestressing, as in the previous examples. It will be appreciated that the distance between 28 and 34' is short, so that excellent stiffness is given to the position included between 28 and 34'.

In FIG. 7 the tab 33' is taken from the cover 10, its material coming from the axial portion of the lug 23, but it is also possible (FIG. 8) to form the tab 33' as a part solid with the cover 10 by taking its material from the rounded portion 35 of the cover 10 and not from the lug 24.

In FIGS. 7 and 8 it is possible to see at J the predetermined play permitting the inclination of the diaphragm 11 in the course of the clutch disengagement operation without any friction clamping occurring. The assembly and functioning of the mechanism according to FIG. 7 or according to FIG. 8 are similar to those described above.

As an alternative, the tabs 33' could be circumferentially offset in relation to the lugs 23, and could for example be cut out of the lugs 38. It would moreover be possible to envisage three series of successive lugs distributed circumferentially, namely the lugs 23, the tabs 33', and the lugs 38.

The invention is not limited to the embodiments described and illustrated, but embraces all variants within the scope of the claims. In particular, the primary fulcrum support of the cover may be formed by a dished portion, as illustrated, or else by an open or closed ring engaged in a groove formed in the cover. The same is true of the secondary fulcrum support.

In the examples illustrated the members solid with the cover pass through holes in the diaphragm, but they may also be arranged in any other appropriate way.

These members solid with the cover may be formed in one piece with the latter as illustrated, or else may be attached to the cover, being for example composed of an annular member comprising one or more segments attached to the cover, or of a plurality of individual elements fastened to the cover.

I claim:

1. In a diaphragm clutch mechanism for a motor vehicle, of the kind comprising a generally annular cover member adapted to be peripherally attached to a reaction member, and intended to be rotationally fast with a pressure plate; a diaphragm comprising a peripheral portion forming a Belleville spring for acting on the pressure plate and a central portion divided into radial fingers for cooperation with a clutch release bearing; and connection means pivotally fastening the diaphragm to the cover for rocking movement with respect thereto, said connection means comprising fastening members extending from the cover each having an axial portion and a radial portion, which portions define between them a wedging bend, and a diaphragm support ring located by said bend, the cover and the support ring defining for the diaphragm a primary fulcrum support and a secondary fulcrum support respectively, these fulcrum supports being disposed substantially opposite one another; the improvement in which the primary and secondary supports are spaced apart a distance greater than the thickness of the diaphragm, whereby a clearance is provided between the supports and the diaphragm, and the support ring is wedged in position on the cover between said bend and a wedging zone spaced from said bend and from said primary and secondary supports, a prestressing force greater than the clutch release force being developed on the support ring between the wedging bend and the aforesaid wedging zone.

2. A diaphragm clutch mechanism according to claim 1, wherein said wedging zone is provided on the cover, and integral tabs extend from said support ring which tabs bear against said wedging zone.

3. A diaphragm clutch mechanism according to claim 2, wherein said tabs are inclined in relation to the axis of the mechanism.

4. A diaphragm clutch mechanism according to claim 2, wherein said tabs extend parallel to the axis of the mechanism.

5. A diaphragm clutch mechanism according to claim 1, wherein said wedging zone is provided by tabs extending from the cover and formed integrally therewith.

6. A diaphragm clutch mechanism according to claim 5, wherein said tabs are cut out from the cover at the part where the axial portions of said fastening members are situated.

7. A diaphragm clutch mechanism according to claim 5, wherein said tabs are cut out from the cover at points offset from the said fastening members.

8. A diaphragm clutch mechanism according to claim 5, wherein said tabs are cut out from the cover in a rounded portion thereof which separates the primary support and the axial portion of the fastening members.

9. A diaphragm clutch mechanism according to claim 1, wherein said support ring is provided with an annular extension radially towards the axis of the mechanism, and passages are provided in this extension through which the axial portions of the said fastening members pass.

10. In a diaphragm clutch for a motor vehicle, comprising a generally annular cover member rotationally fast with a pressure plate and adapted to be peripherally attached to a reaction member, a diaphragm comprising a peripheral portion forming a Belleville spring for acting on the pressure plate and a central portion divided into radial fingers for co-operation with a clutch release bearing; and connection means pivotally fastening the diaphragm to the cover for rocking movement with respect thereto, said connection means comprising fastening members extending from the cover each having an axial portion and a radial portion, which portions define between them a wedging bend, and a diaphragm support ring located by said bend, the cover and the support ring defining for the diaphragm a primary fulcrum support and a secondary fulcrum support respectively, these fulcrum supports being disposed substantially opposite one another; the improvement in which the primary and secondary supports are spaced apart a distance greater than the thickness of the diaphragm, whereby a clearance is provided between the supports and the diaphragm, and the support ring is wedged in position on the cover between said bend and a wedged in position on the cover between said bend and a wedging zone spaced from said bend and from said primary and secondary supports, a prestressing force greater than the clutch release force being developed on the support ring between the wedging bend and the aforesaid wedging zone.

* * * * *